United States Patent
Redi

(10) Patent No.: US 7,330,736 B2
(45) Date of Patent: *Feb. 12, 2008

(54) METHODS AND APPARATUS FOR REDUCED ENERGY COMMUNICATION IN AN AD HOC NETWORK

(75) Inventor: Jason Keith Redi, Belmont, MA (US)

(73) Assignee: BBN Technologies Corp., Cambridge, MA (US)

( * ) Notice: Subject to any disclaimer, the term of this patent is extended or adjusted under 35 U.S.C. 154(b) by 359 days.

This patent is subject to a terminal disclaimer.

(21) Appl. No.: 11/078,257

(22) Filed: Mar. 10, 2005

(65) Prior Publication Data

US 2006/0135145 A1    Jun. 22, 2006

Related U.S. Application Data

(60) Provisional application No. 60/637,198, filed on Dec. 17, 2004.

(51) Int. Cl.
*H04B 7/00* (2006.01)
(52) U.S. Cl. .................. 455/553.1; 455/41.1; 455/574; 455/343.4; 455/452.1; 370/318; 370/348
(58) Field of Classification Search ............ 455/550.1, 455/574, 343.4, 343.1–343.2, 560, 41.2, 455/553.1, 502, 515, 84, 517, 552.1, 69, 455/73, 90.1–90.3, 95, 227, 127.5, 522; 370/311, 370/318, 348, 324, 350, 328, 338, 395.4, 370/395.52
See application file for complete search history.

(56) References Cited

U.S. PATENT DOCUMENTS

| | | | |
|---|---|---|---|
| 4,964,121 A | 10/1990 | Moore | |
| 5,128,938 A | 7/1992 | Borras | |
| 5,203,020 A | 4/1993 | Sato et al. | |
| 5,301,225 A | 4/1994 | Suzuki et al. | |
| 5,583,866 A | 12/1996 | Vook et al. | |
| 5,590,396 A | 12/1996 | Henry | |
| 5,710,975 A | 1/1998 | Bernhardt et al. | |
| 5,790,946 A | 8/1998 | Rotzoll | |
| 6,052,779 A | 4/2000 | Jackson et al. | |
| 6,058,106 A * | 5/2000 | Cudak et al. ............... | 370/313 |
| 6,104,708 A | 8/2000 | Bergamo | |
| 6,192,230 B1 | 2/2001 | van Bokhorst et al. | |
| 6,208,247 B1 | 3/2001 | Agre et al. | |

(Continued)

OTHER PUBLICATIONS

Warneke et al, "Ultra-Low Power Communication Logic Circuits for Distributed Sensor Networks," UC Berkeley, 1998, 7 pages.

(Continued)

*Primary Examiner*—Duc M. Nguyen
*Assistant Examiner*—Kamran Afshar
(74) *Attorney, Agent, or Firm*—Ropes & Gray LLP

(57) ABSTRACT

The invention relates to communications devices for reduced energy communications in an ad hoc network. The communication device includes a first low powered transceiver for initiating communications with other communications devices and a second transceiver for transmitting data messages to the other communications devices once communication is initiated. The communication device also includes a communications control processor for determining times at which the other communications devices will be available to receive communications based on scheduling data received from those communication devices.

32 Claims, 5 Drawing Sheets

U.S. PATENT DOCUMENTS

| | | | |
|---|---|---|---|
| 6,243,579 | B1 | 6/2001 | Kari et al. |
| 6,292,508 | B1 | 9/2001 | Hong et al. |
| 6,374,311 | B1 | 4/2002 | Mahany et al. |
| 6,381,467 | B1 | 4/2002 | Hill et al. |
| 6,414,955 | B1 | 7/2002 | Clare et al. |
| 6,463,307 | B1 | 10/2002 | Larsson et al. |
| 6,473,607 | B1 | 10/2002 | Shohara et al. |
| 6,477,361 | B1 | 11/2002 | LaGrotta et al. |
| 6,564,074 | B2 | 5/2003 | Romans |
| 6,574,269 | B1 | 6/2003 | Bergamo |
| 6,583,675 | B2 | 6/2003 | Gomez |
| 6,590,889 | B1 | 7/2003 | Preuss et al. |
| 6,694,149 | B1 | 2/2004 | Ady et al. |
| 6,714,983 | B1 | 3/2004 | Koenck et al. |
| 6,745,027 | B2 | 6/2004 | Twitchell, Jr. |
| 6,760,584 | B2 | 7/2004 | Jou |
| 6,894,975 | B1 * | 5/2005 | Partyka .................. 370/235 |
| 6,981,052 | B1 * | 12/2005 | Cheriton .................. 709/232 |
| 7,027,392 | B2 * | 4/2006 | Holtzman et al. .......... 370/230 |
| 7,103,344 | B2 * | 9/2006 | Menard .................. 455/343.2 |
| 7,110,783 | B2 * | 9/2006 | Bahl et al. .................. 455/516 |
| 7,142,520 | B1 | 11/2006 | Haverinen et al. |
| 2002/0067736 | A1 | 6/2002 | Garcia-Luna-Aceves et al. |
| 2002/0071395 | A1 | 6/2002 | Redi et al. |
| 2002/0146985 | A1 | 10/2002 | Naden |
| 2002/0147816 | A1 * | 10/2002 | Hlasny .................. 709/227 |
| 2003/0066090 | A1 | 4/2003 | Traw et al. |
| 2003/0099210 | A1 * | 5/2003 | O'Toole et al. ............. 370/311 |
| 2003/0114204 | A1 * | 6/2003 | Allen et al. .................. 455/574 |
| 2003/0119568 | A1 | 6/2003 | Menard |
| 2003/0185170 | A1 * | 10/2003 | Allen et al. .................. 370/329 |
| 2004/0077353 | A1 * | 4/2004 | Mahany .................. 455/448 |
| 2004/0125773 | A1 * | 7/2004 | Wilson et al. ............. 370/337 |
| 2004/0218580 | A1 | 11/2004 | Bahl et al. |
| 2004/0230638 | A1 | 11/2004 | Balachandran et al. |
| 2005/0059347 | A1 * | 3/2005 | Haartsen .................. 455/41.2 |
| 2005/0215280 | A1 | 9/2005 | Twitchell, Jr. |
| 2006/0068837 | A1 * | 3/2006 | Malone .................. 455/552.1 |
| 2006/0107081 | A1 | 5/2006 | Krantz et al. |
| 2006/0229083 | A1 * | 10/2006 | Redi .................. 455/453 |

OTHER PUBLICATIONS

Warneke, "Ultra-Low Power Circuits for Distributed Sensor Networks (Smart Dust)," UC Berkeley, (Print Date: Jun. 15, 2003), p. 1-3.

Darabi et al, "An Ultra Low Power 900 MHz CMOS Receiver for Wireless Paging," University of California, Los Angeles, May 17, 1998, p. 1-33.

Liu et al, "A Bluetooth Scatternet-Route Structure for Multihop Ad Hoc Networks," IEEE Journal on Selected Areas in Communications, 21:2(229-239), Feb. 2003.

Salkintzis et al, "Performance analysis of a Downlink MAC Protocol with Power-Saving Support," IEE Tranactions on Vehicular Technology, 49:3 (1029-1040); May 2000.

Chlamtac et al, "An Energy-Conserving Access Protocol for Wireless Communication," Proceedings of The International Conference on Communications, Jun. 8-12, 1997; 1-4.

* cited by examiner

METHODS AND APPARATUS FOR REDUCED ENERGY COMMUNICATION IN AN AD HOC NETWORK

CROSS REFERENCE TO RELATED APPLICATIONS

The instant application claims priority from provisional application No. 60/637,198, filed Dec. 17, 2004, the disclosure of which is incorporated herein by reference in its entirety.

GOVERNMENT SUPPORT

Work described herein was funded, in part, by the Department of the Interior, Fort Huachuca, Ariz., Contract Number NBCHC030087. The United States government has certain rights in the invention.

FIELD OF THE INVENTION

The invention relates to communication devices and methods of use thereof in ad hoc networks that operate with reduced energy consumption.

BACKGROUND

Ad hoc networks include a plurality of nodes, many of which are mobile, in wireless communication with one another. The topology of ad hoc networks varies as the nodes move with respect to each other, coming in and out of range of each others' transmitters. Typically, nodes in ad hoc networks schedule their communications with each other using various time division and/or frequency division multiplexing schemes.

In practice, a communication device using a periodic TDMA communications protocol remains in one of two states, transmit or receive. To remain in either state, the communication device supplies power to a transceiver. For many communication devices, the device is predominantly idle, waiting in a powered receive state in case an incoming message arrives. A deficiency of this approach is that in low network traffic environments, the amount of energy used in an idle receive state dominates the total energy used by the communication device.

SUMMARY

The invention addresses the deficiencies in the prior art by providing, in various aspects, systems, methods and devices relating to limiting the time that the communication devices spend in a powered receive state. According to one embodiment, a first communication device includes at least one transceiver and a communications control processor. The communications control processor receives scheduling data from a second communication device. The scheduling data enables the first communication to predict a time at which the second communication device will be available to receive communications. The communications control processor causes the transceiver to transmit a communication to the second communication device at the predicted time.

According to another embodiment, the second communication device also includes at least one transceiver and a communications control processor. The communication control processor of the second communication device determines the times at which the second communication device will turn on its transceiver to await receipt of messages. Thus, with both the first and second communication devices, unless their respective communications control processors determine that the second communication device is scheduled to be available to receive a message, they can both power-down their transceivers to conserve energy.

In a further embodiment, the scheduling data sent by the second communication device to the first communication device includes a seed datum, a cycle state, and at least one availability threshold. Availability thresholds include unicast and multicast thresholds for indicating the availability of the second communication device to receive unicast and multicast messages, respectively. A feature of the invention includes the ability for the communications control processor of the second communication device to dynamically alter its thresholds in response to changes in the network environment. For example, the second communication device may change its thresholds in response to a change in the level of traffic on the network, or in response to detecting a change in the network topology.

According to a further embodiment, both the first and second communication devices utilize two transceivers, a higher-powered transceiver and a low-powered transceiver. The lower-powered transceivers of the communication devices transmit and receive communication initiation messages, which indicate the imminent transmission of a data message. The higher-powered transceivers of the communication devices transmit and receive data messages. Additional features include the communication devices transmitting and/or receiving initiation acknowledgement messages to confirm availability for receiving data, and data acknowledgement messages to confirm successful receipt of data messages.

According to another embodiment, the communications processor of the first communication device employs a pseudorandom number generator to predict when the second communication device will be available for receiving communications. Similarly, the communications processor of the second communication device also uses a pseudo-random number generator to determine when it will be available to receive communications. According to one implementation, the scheduling data includes a seed datum, a cycle state, and one or more availability thresholds, and the processor of the first communication device compares the output of the pseudorandom number generator to the one or more availability thresholds. One feature of the invention includes the ability of the receiving communication device to dynamically alter its availability thresholds based on changes to levels of network traffic and/or changes in network topology.

At the predicted time, the first communication device powers up its lower-powered transceiver and transmits a communication initiation message to the second communication device. Similarly, the lower-powered transceiver of the second communication device is powered up to await receipt of a communication initiation message from the first communication device. If the low-powered transceiver of the second communication device receives a communication initiation message, it powers up its higher-powered transceiver to receive an incoming data communication. Otherwise, it powers down its transceivers and awaits a subsequent time in which it is available to receive data messages. Subsequent to sending the communication message, the first communication device powers up its higher-powered transceiver and transmits the data communication to the second communication device.

In some embodiments, the first communication device waits for a confirmation from the second communication device that its higher-powered transceiver is ready prior to sending the data communication. Also, it should be noted that data communications may be sent from the second communication device to the first communication device using the same protocol.

BRIEF DESCRIPTION OF THE DRAWINGS

The invention may be better understood from the following illustrative description with reference to the following drawings.

DESCRIPTION OF AN ILLUSTRATIVE EMBODIMENT

One class of protocols often used in an ad hoc networking environment is a Time Division Multiple Access (TDMA) Multiplexing Media-Access Control (MAC) layer protocol. In a TDMA communications protocol, time is divided into a number of time slots, and multiple users of a communications channel are assigned different time slots in which they can transmit communications. Typically, the time slots are allotted among the communication devices on the channel in a periodic fashion. In practice, a communication device using a periodic TDMA communications protocol remains in one of two states, transmit or receive. To remain in either state, the communication device supplies power to a transceiver. A powered state is referred to hereinafter alternatively as "powered" or "awake." The process of transitioning into a powered state is referred to alternatively as "powering up" or "waking up." For many communication devices, the device is predominantly idle, waiting in a powered state to receive an incoming message in case one arrives. In low network traffic environments, the amount of energy used in an idle receive state dominates the total energy used by the communication device.

A communication device can conserve power by limiting the time it spends in a powered receive state. The invention, in various illustrative embodiments, limits the time devices spend in the powered receive state. According to one approach, the invention establishes a schedule of when the communication device is available to receive messages. Unless scheduled to be available, the communication device can power-down its transceiver. To improve efficiency, a communication device may provide other devices on a network with information from which the other devices can determine the communication device's availability schedule.

Figure 1:
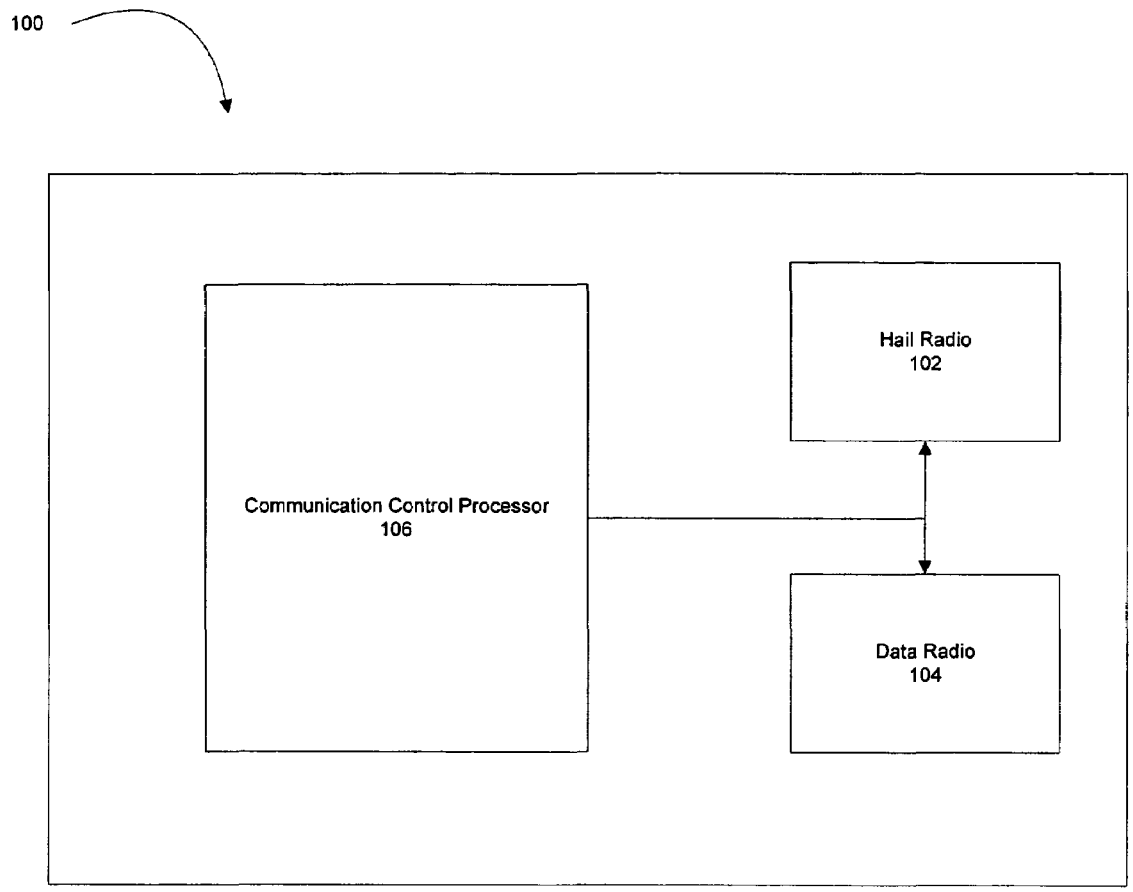
FIG. 1 is a conceptual block diagram of a communication device for reduced energy wireless communication according to an illustrative embodiment of the invention.

FIG. 1 is a conceptual block diagram of a communication device 100 for reduced energy wireless communication according to an illustrative embodiment of the invention. The communication device 100 includes two transceivers 102 and 104 and a communications control processor 106.

One transceiver 102 is a hail radio used for transmitting communication initiation messages (such as indicated at 205 in FIG. 2) to other devices indicating that a data message from the communication device 100 is forthcoming, and for receiving similar messages from other communication devices. The hail radio 102 transmits and receives messages at a relatively low data rate, for example, at tens of kilobits per second (kbs). Low data rate transceivers require less precision to operate than higher data rate transceivers and therefore, operates using less power.

In the illustrative embodiment, the communication device 100 utilizes a ChipCon CC1010 chipset, provided by ChipCon AS of Oslo Norway, for the hail radio 102. The ChipCon CC1010 uses 150 mW to transmit, 30 mW in receipt mode, and 0.3 mW in standby mode. The ChipCon CC1010 can transmit at data rates ranging from 600-76,000 bps. Other suitable hail radios include, without limitation, the Micrel MICRF501 and the Micrel MICRF500, provided by Micrel Semiconductor Corporation of San Jose, Calif.

The other transceiver 104 is a data radio for transmitting the data messages announced by the hail radio 102. The data radio 104 transmits and receives data messages at a data rate that is higher than the data rate used by the hail radio 102. As a result, the second transceiver uses more power. The illustrative communication device 100 uses a standard 802.11b transceiver for its data radio 104. Such transceivers use about 1.2 W to transmit data, about 900 mW while in receipt mode, and about 850 mW when asleep. The data radio 104 can transmit at data rates ranging from about 1-11 Mbps.

The communications control processor 106 in the illustrative communication device 100 controls the receipt and transmission of communications and also regulates the scheduling thereof. A central processing unit of a general purpose computer running specialized communications software serves as the communications control processor 106 of the illustrative communication device 100. In other implementations, the communications control processor 106 may be implemented using one or a combination of a general or special purpose computer, software, and analog or digital integrated circuits, including, without limitation, application specific integrated circuits (ASICs) and digital signal processors (DSPs). The communications control processor 106 utilizes a modified TDMA multiplexing scheme to control transmission and reception of communications. In the modified TDMA multiplexing scheme of the invention, time slots are further subdivided into a number of time mini-slots.

Figure 2:
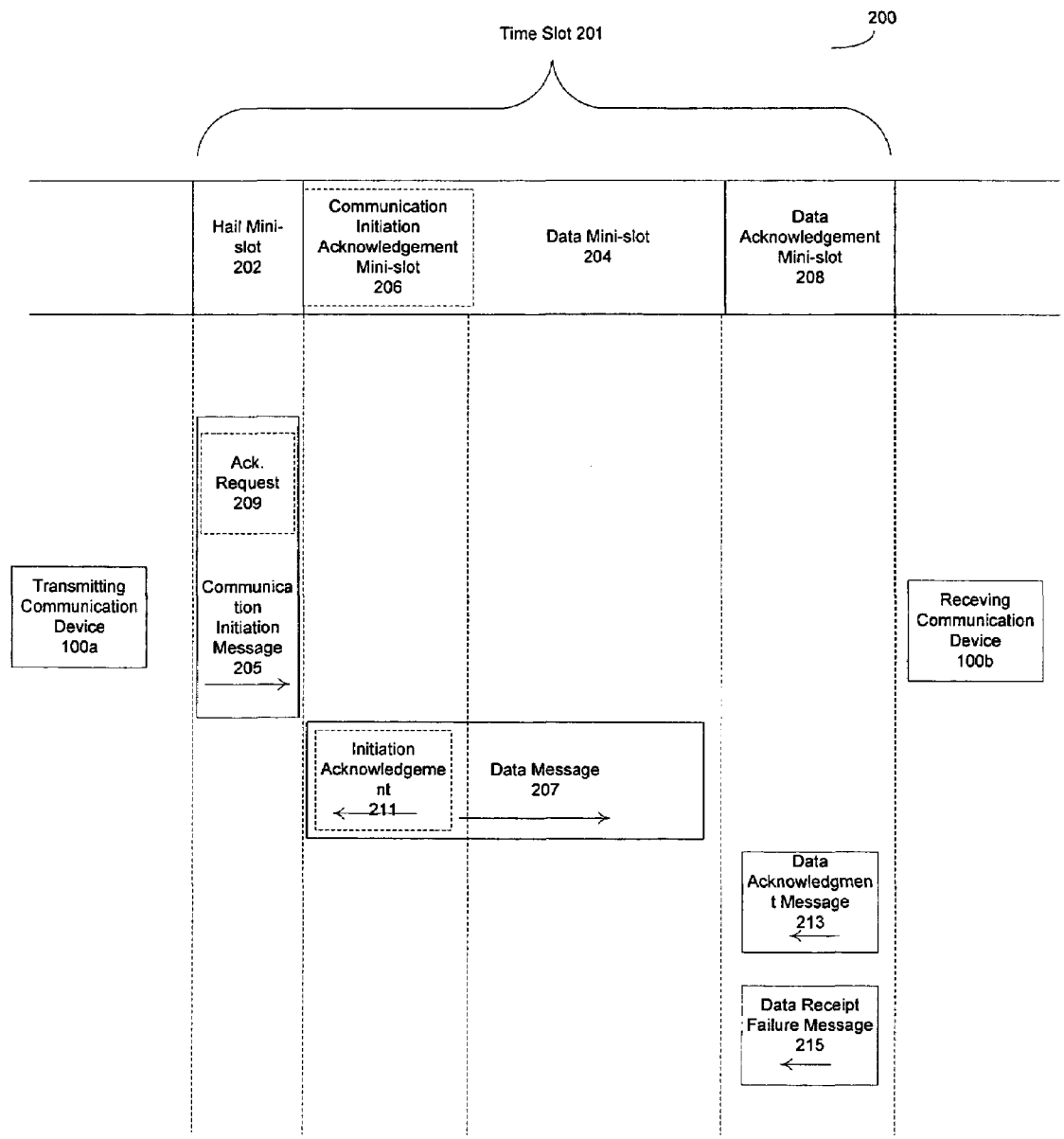
FIG. 2 is a conceptual diagram of an exemplary transmission and time allocation scheme within a scheduled time slot employed with the illustrative embodiment of the invention of FIG. 1.

FIG. 2 is a conceptual diagram of an exemplary transmission and time allocation scheme 200 for use within a scheduled time slot 201 employed with the illustrative embodiment of the invention of FIG. 1. The conceptual diagram of the time allocation scheme 200 for the time slot 201 is located at the top of FIG. 2. Below the diagram of the time slot 201, FIG. 2 includes a conceptual diagram of a series of messages representing the transmission scheme 200. Each message corresponds to the portion of the time slot 201 beneath which it is illustrated. Beneath each message, an arrow indicates the direction of the message. An arrow pointing to the right indicates a message sent by a transmitting communication device 100a, and an arrow pointing to the left indicates a message sent by a receiving communication device 100b. Although this need not be the case, for illustrative purposes the devices 100a and 100b are both substantially identical to the communication device 100 of FIG. 1. Accordingly, like reference numerals appended with an "a" or "b" are used when referring to the components of the devices 102a and 102b.

Referring now to FIGS. 1 and 2, the illustrative time slot 201 includes at least a hail mini-slot 202 and a data mini-slot 204. The data mini-slot 204 is preferably longer than the hail mini-slot 202. During the hail mini-slot 202, if a transmitting communication device 100a has a queued message to send to a receiving communication device 100b that is available for receiving a communication, the hail radio 102a of the transmitting communications device 100a transmits a communication initiation message 205 to the receiving communication device 100b. If the receiving communication device 100b is scheduled to be available for receiving messages during a given time slot 201, the receiving communication device 100b has its hail radio 102b powered up and is awaiting receipt of a communication initiation message, such as the message 205. Preferably, the data radio 104b is powered down during the hail mini-slot 202.

The data mini-slot 204 is used for transmitting and receiving data messages 207. If a transmitting communication device 100a transmits a communication initiation message 205 during the hail mini-slot 202, the transmitting communication device 100a wakes up its data radio 104 and transmits a data message 207 to the receiving communication device 100b during the data mini-slot 204.

In the case of a receiving communication device 100b that is scheduled to be available for receiving messages during a time slot 201, its activity during the data mini-slot 204 depends upon whether it receives a communication initiation message 205 during the hail mini-slot 202. If the receiving communication device 100b receives a communication initiation message 205 during the hail mini-slot 202, it powers down its hail radio 102b and wakes up its data radio 104b to await receipt of a data message 207 in the data mini-slot 204. If the receiving communication device 100b does not receive a communication initiation message 205 during the hail mini-slot 202, the receiving communication device 100b powers down its hail radio 102b and awaits its next scheduled receive time. The data radio 104b remains powered down to conserve power as no message is expected to arrive.

In alternative implementations of the transmission scheme 201, a transmitting communication device 100a reserves a first portion of the data mini-slot 204 as a communication initiation acknowledgment mini-slot 206. In such implementations, the communications control processor 106a of the transmitting communication device 100a can selectively add a hail acknowledgement request 209 into the communication initiation message 205. In response to receiving a communication initiation message 205 that includes a hail acknowledgement request 209, the receiving communication device 100b sends an initiation acknowledgment message 211 back to the transmitting communication device 100a during the communication initiation acknowledgment mini-slot 206 using either the hail radio 102b or the data radio 104b. The transmitting communication device 100a waits to power up its data radio 104a until it receives the initiation acknowledgement message 211. Upon receipt, the transmitting communication device 100a proceeds with transmitting a data message 207. If the transmitting communication device 100a does not receive the requested initiation acknowledgement message 211, the transmitting communication device 100a powers down both radios 102a and 104a and waits for the next time slot 201 in which the intended recipient of the data message is scheduled to be awake.

According to another feature, the timing scheme 200 of the invention includes a data acknowledgement mini-slot 208. In implementations employing the data acknowledgment mini-slot 208, in response to receiving a communication initiation message 205 and also an expected data message 207, the receiving communication device 100b informs the transmitting communication device 100a of the successful receipt by sending a data acknowledgement message 213 during the data acknowledgment mini-slot 208. According to some implementations, a receiving communication device 100b only transmits a data acknowledgement message 213 if requested in the data 207 or initiation message 205.

Not receiving an expected acknowledgement message 213 prompts the transmitting communication device 100a to resend the data message 207 at a later time. In response to not receiving an expected data message 207, the receiving communication device 100b sends out a data receipt failure message 215 during the data acknowledgement mini-slot 208. The receiving communication device 100b may also send a data receipt failure message 215 back to a sending communication device 100a for other reasons, such as based on indications that a subsequent destination of a message is not reachable by the receiving communication device 100b. According to some illustrative embodiments, the data receipt failure message 215 includes an error code describing the reason for its transmission.

According to the illustrative embodiment, the communication initiation message 205 has the following format: transmitting communication device 100a address (12 bits), receiving communication device 100b address (12 bits), code rate request (2 bits), initiation acknowledgement request (1 bit) and 5 padding bits (total length of 32 bits). The communication device's 100a address can be useful, and in some instances needed. For example, if multiple hails arrive at a receiving communication device 100b from multiple transmitting communication devices 100a at the same time, the receiving communication device 100b sends an initiation acknowledgement message 205 to one of the transmitting communication devices 100a, indicating which transmitting communication device 100a gets to send. To do so, the receiving communication device 100b needs the address of the transmitting communication device 100a. In very low duty-cycle systems, the likelihood of receiving a multiple communication initiations requests may become so low that the transmitting communication device 100a address can be omitted. In alternative embodiments, the receiving communication device 100b can receive multiple data messages from multiple transmitting communication devices 100a in a single time slot 201. The communication devices 100 employ a frequency division multiplexing scheme, a code division multiplexing scheme, or a data mini-slot 204 time division scheme to allow the multi-node, single time slot 201 communication. In such embodiments, the transmitting communication device 100a address is used to differentiate between incoming transmissions.

The receiving communication device 100b address indicates the intended destination of the communication initiation message 205. The above-mentioned code rate request data field indicates the encoding rate with which the transmitting communication device 100a intends to transmit the subsequent data message. The above-mentioned initiation acknowledgement request bit indicates whether an initiation acknowledgement message is requested.

In low duty-cycle environments, a transmitting communication device 100a transmits the communication initiation message 205 at a set of H frequencies, where H is a small value such as 5. The multiple frequency repetition increases the likelihood that the communication initiation message 205 will be received even in the presence of frequency selective fading.

The receiving communication device 100b uses the following format for initiation acknowledgment messages 209: receiving communication device 100a address (12 bits), transmitting communication device 100a address (12 bits), a code rate (2 bits), and a power level modification (4 bits). The receiving communication device 100b address indicates the address of the sender of the communication initiation message 205. The transmitting communication device 100a address corresponds to the address of the transmitting communication device 100a that sent the communication initiation message 205. The code rate field confirms an encoding rate for the expected data message 207. The power level modification data field describes the amount of excess power received by the receiving communication device 100b, and therefore, the amount of power by which the transmitting communication device 100a can decrease its data transmission (given an appropriate modification for the different modulation scheme and datarate). This reduction in power is also used to determine the power used for transmitting the initiation acknowledgement message 209. In the embodiment described above in which a receiving communication device 100b receives data messages 207 from multiple transmitting communication devices 100a during a single time slot, the initiation activation message 211 includes a field indicating the number of and addresses for each the transmitting communication devices 100athat are allowed to transmit during the data mini-slot 204 of the time slot 201.

The data message 207 includes a header with the following format: want-data-acknowledgement (1 bit), more-data (1 bit), ToS (2 bits), final destination of the data (12 bits), and original source (12 bits). The want-data-acknowledgement bit indicates whether the sender is requesting an acknowledgement of the data message 207. The final destination and original source indicate the addresses of the final intended destination and the initial sender, respectively, of the data message 207. The ToS data field includes standard quality of service parameters typically used in wireless networking, including priority levels or IP type of service parameters.

The more-data bit indicates whether further data is queued up to be transmitted from the sender to the recipient, for example, if a complete data message 207 is too long for a single data mini-slot 204. In some implementations, during periods of very low network traffic, to avoid the problem of needing to divide traffic over many time slots 201, which may be of limited number and space far apart, a transmitting communication device 100a sets the more-data bit. In response to receiving a data message 207 in which the more-data bit is set, the receiving communication device 100 keeps its data radio 104 awake during the subsequent time slot 201, even if the receiving communications device 100b is not scheduled to be awake during that time slot 201. During periods of high traffic load, the use of the more-data bit can decrease fairness and throughput over the network. Therefore, the communication devices 100a and 100b limit use of the more-data bit to network environments in which the average local traffic load is less than a measured threshold. The communication devices 100a and 100b determine a local traffic measure by averaging the utilization metrics of neighboring communication devices.

A data acknowledgement message 213 has the following format: receiving communication device 100b address (12 bits), transmitting communication device addresses (12 bits) and a data acknowledgement code (4 bits). The receiving communication device 100b address field refers to the sender of the data acknowledgement message. The transmitting communication device 100a address field refers to the communication device 100a that sent the data packet to the receiving communication device 100b. The acknowledgement code field includes a code indicating whether the data message 107 was successfully received. The message can alternatively include a number and list of transmitting communication devices 100a being acknowledged if applicable. It should be noted that other message formats and frequency usages may be employed in alternative implementations without departing from the scope of the invention.

Figure 3:
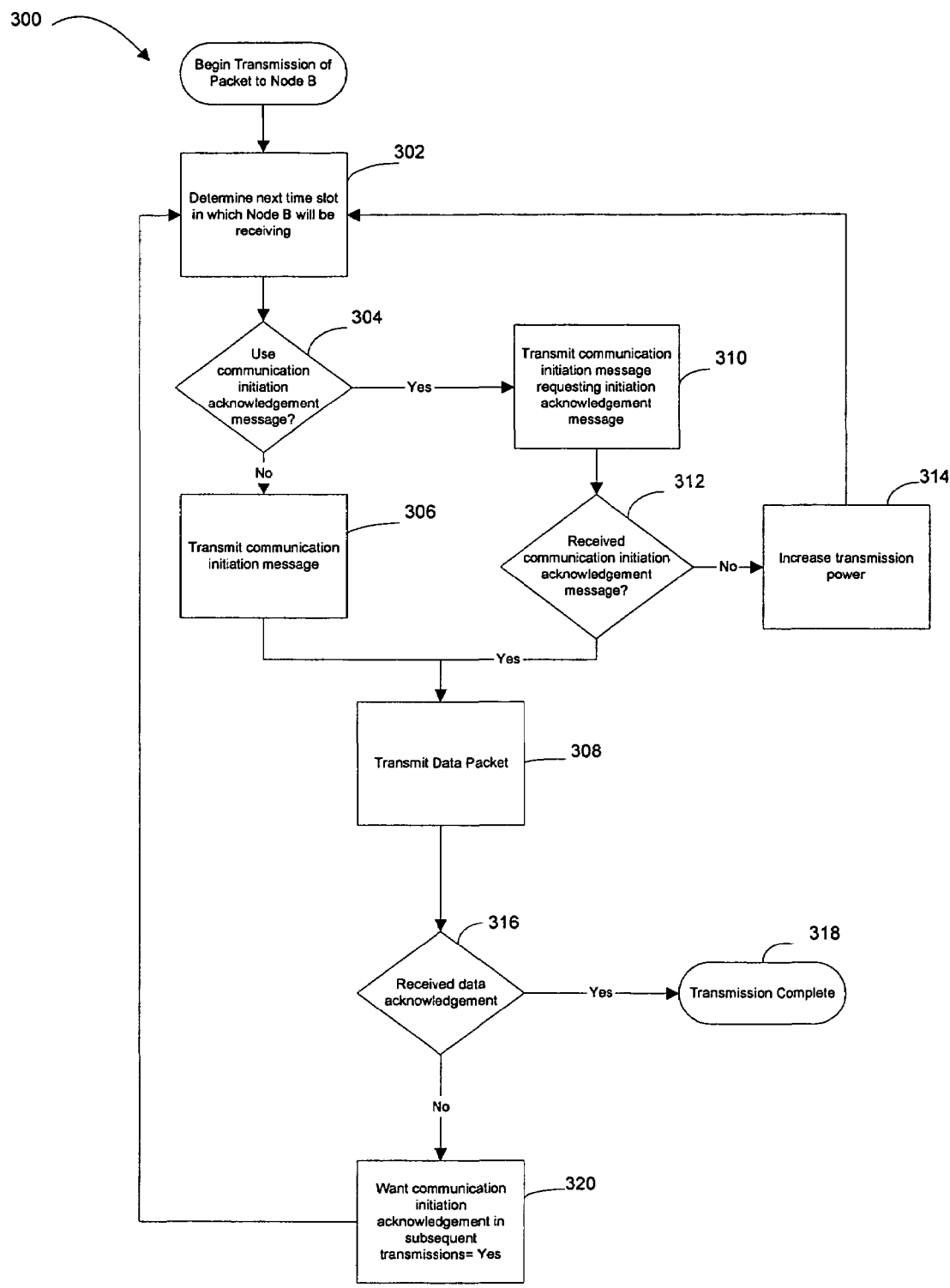
FIG. 3 is a flow chart of a method for transmitting data from a first communication device, such as that depicted in FIG. 1, to a second communication device according to an illustrated embodiment of the invention.

FIG. 3 is a flow chart depicting a method for transmitting a data message from a communication device 100a to a communication device 100b, based on the illustrative time allocation scheme 200. Referring to FIGS. 1-3, initially, the communication device 100a calculates the next time slot 201 in which communication device 100b is scheduled to be available to receive a data packet (step 302). The communication device 100a then remains powered down until this scheduled time slot 201, though the communication device 100a may power up before the scheduled time slot 201 to send or receive packets to or from other communication devices. Illustrative approaches to calculating time slot 201 availability for any particular device are described below with respect to FIG. 5.

At step 304 the communication device 100a branches either to step 306 to transmit the communication initiation message 205 without an acknowledgement request 211 or to step 310 to transmit the communication initiation message 205 with an acknowledgement request 211. Requesting an initiation acknowledgment message 211 uses more transmission time and power than not requesting one. Requesting an initiation acknowledgement message 211 also cuts into the data mini-slot 204 of the time slot 201, resulting in the transmission of less data in the time slot 201. On the other hand, transmitting a data message 207 to a recipient that fails to receive it (the probability of which is reduced by requiring an initiation acknowledgment message 211 before transmission) wastes energy resources. In some illustrative embodiments, the communication device 100a requests an initiation acknowledgement 211, for example, if the transmission is a retransmission of a previously failed transmission of a data message 207; there is known movement or network change occurring in the network; more than a particular amount of time has passed since the communication device 100a has received a packet from the communication device 100b; and/or the communication control processor 106 predicts a higher than usual error probability for the transmission.

At step 306, the communication device 100a transmits a communication initiation message 205 to the communication device 100b during the hail mini-slot 202 of the scheduled time slot 201 using its hail radio 102a. The communication device 100a then powers up its data radio 104a and powers down its hail radio 102a, and transmits a data message 207 to the communication device 100b at step 308 using the data radio 104a during the data mini-slot 204 of the scheduled time slot 201.

At step 312, the communication device 100a transmits, using its hail radio 102a, a communication initiation message 205 including an initiation acknowledgement request 209 (e.g., the initiation acknowledgement bit of the communication initiation message is set to 1) during the hail mini-slot 202. The communication device 100a awaits receipt of an initiation acknowledgement message 211 (step 312) during the communication initiation acknowledgement mini-slot 206. If communication device 100a does not receive an initiation acknowledgement message 211, it determines the next time slot 201 in which the communication device 100b is expected to be available to receive a data packet (step 302). The communication device 100a may also increase the power used to transmit subsequent communication initiation messages 205 to the communication device 100b (step 314). If the communication device 100a receives an initiation acknowledgement message 211, it powers down its hail radio 102a, powers-up its data radio 104b, and transmits a data message 207 to the communication device 100b (step 308) using the data radio 104b during the data mini-slot 204. The data message 207 is sent at the code rate and power determined in the communication initiation message 205 and/or initiation acknowledgement message 211.

After completing transmission of the data message 207 in either scenario (i.e., with or without an initiation acknowledgement request 209), the communication device 100a awaits receipt of a data acknowledgment message 213 from the communication device 100b (step 316) during the data acknowledgement mini-slot 208. If the communication device 100a receives a data acknowledgement message 213, transmission of the data message 207 is considered to be complete (step 318), and the communication device 100a powers down its data radio 104a. If the communication device 100a does not receive a data acknowledgement message 213, or if it receives a data receipt failure message 215, it determines the next time slot 201 in which the communication device 100b is expected to be available to receive messages. The communication device 100a powers down its data radio 104a and waits until the determined time slot 201 (step 302) to attempt retransmission. In response to the communication device 100a not receiving a data acknowledgement message 213, or receiving a data receipt failure message 215, it may determine that subsequent communication initiation messages 205 will include initiation acknowledgement requests 209 (step 320).

Figure 4:
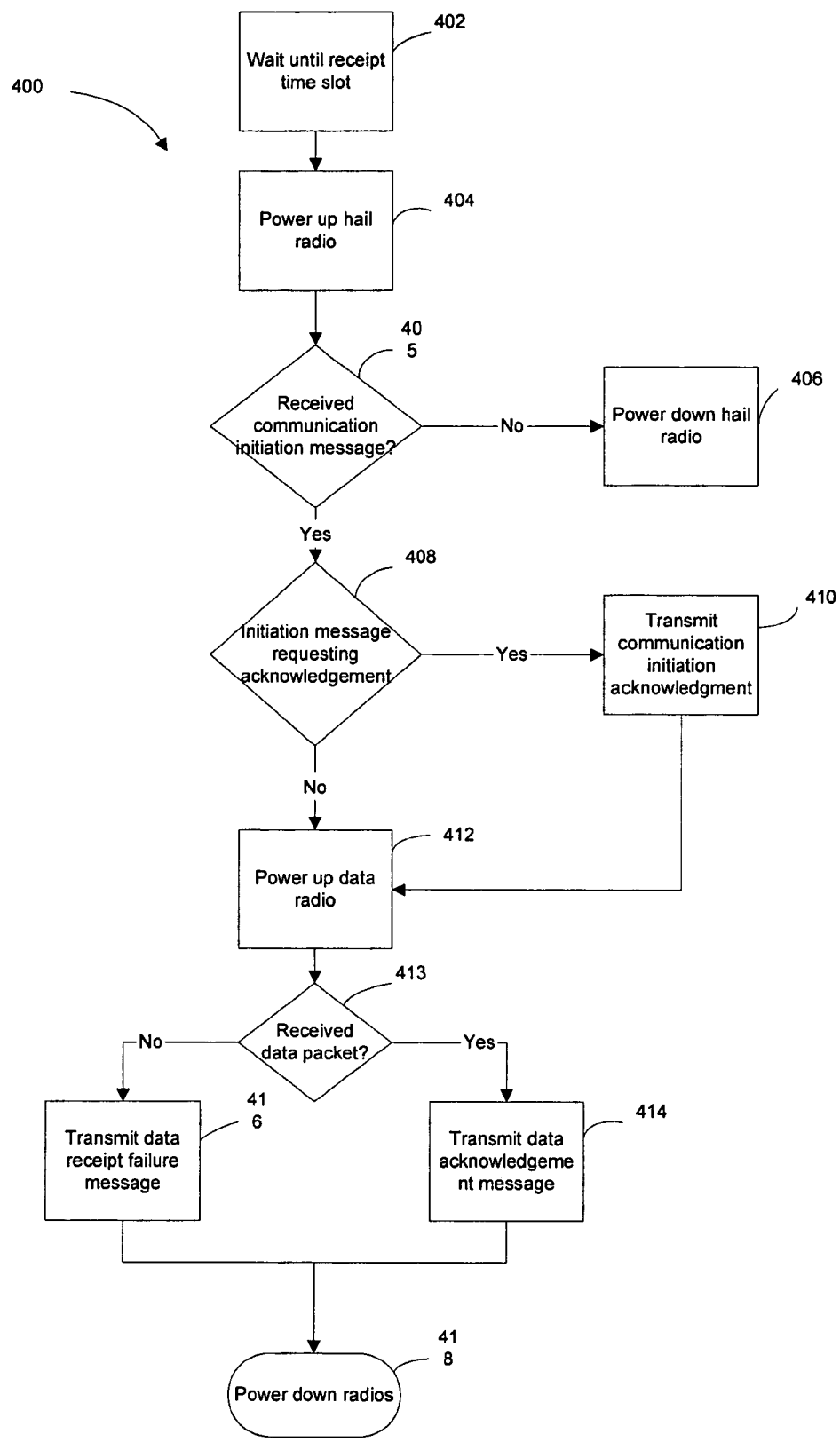
FIG. 4 is a flow chart of a method for receiving data at a first communication device, such as that depicted in FIG. 1, from a second communication device according to an illustrated embodiment of the invention.

FIG. 4 is a flow chart depicting an illustrative process by which the communication device 100b receives a data packet from the communication device 100a. To receive a data message 207, the communication device 100b waits until a time slot in which it is scheduled to wake up for receiving messages (step 402). At the scheduled wake up time, it powers up its hail radio 102b (Step 404) and awaits receipt of a communication initiation message 205 during the hail mini-slot 202. If the communication device 100b does not receive a communication initiation message 205 during the hail mini-slot 302, it powers down its hail radio 102 for the remainder of the time slot 201 (step 406).

If the communication device 100b receives a communication initiation message 205 during the hail mini-slot 202, it analyzes the communication initiation message 205 to determine whether an initiation acknowledgement message 211 is requested (step 408). If the communication initiation message 205 requests an initiation acknowledgement 211, it sends one to the communication device 100a during the communication initiation acknowledgement mini-slot 206 (step 410). Communication device 100b then powers up its data radio 104b and awaits receipt of a data message 207 (step 412) during the data mini-slot 204. If the communication device 100b successfully receives a data message 207 from the communication device 100a, it acknowledges receipt of the data message 207 during the data acknowledgement mini-slot 208 (step 414) by sending a data acknowledgement message 213. If the data mini-slot 204 ends without the communication device 100b successfully receiving a data message 207 from the communication device 100a, it transmits a data receipt failure message 215 (step 416). The communication device 100b then powers down its data radio 104 (step 418). In an alternative implementation, if the communication device 100b fails to receive successfully a data message 213, it keeps its radios 102b and 104b powered up for the subsequent time slot 201 to await retransmission.

As mentioned above with regard to FIG. 1, in addition to controlling the transmission scheme within the time slot 201 described above, the communication control processor 106 also determines in which time slot 201 a particular communication device 100 will be available to receive unicast and multicast messages, determines in which time slot 201 the communication device 100 will be available to broadcast or multicast messages, and predicts in which time slots other communication devices 100 will wake up to receive unicast messages.

According to the illustrative embodiment, the scheduling process includes a threshold analysis, taking into account the output of a shared pseudorandom number generator. Based on an initial seed value, the shared pseudorandom number generator outputs a predictable series of discrete values. The position of a discrete value in the series is referred to as the cycle state. For example, the output of the pseudorandom generator with a seed value of X and a cycle state of 5 refers to the fifth value output by the pseudorandom generator seeded with value X. The cycle state increments at the completion of a time slot. In general, a pseudorandom number generator output corresponding to a particular time slot 201 that falls below a given threshold indicates a wakeup of a communication device 100 during that time slot 201. In alternate implementations, the communication devices 100 in a network have knowledge of the dynamics of the pseudorandom number generators of their neighbors. For illustrative purposes only, the former is assumed hereafter.

More particularly, to determine a wake-up schedule for itself, and to predict a wake up schedule for its neighbors, a communications device 100 stores a number of variables including unicast and multicast availability thresholds, seed values, and cycle states (collectively referred to as "scheduling data") for itself and for one or more neighbors of the communication device 100. The availability thresholds range between 0 and 1.0. A communication device 100, when entering a network is assigned a unique seed value which serves as an identifier for the communication device 100. Alternatively, the seed value is hardwired into the communication device 100. The communication device 100 stores multiple assigned/hardwired seed values for generating different pseudorandom numbers. For example, the communication device 100 may use a first seed value for generating pseudorandom numbers for unicast scheduling and a second seed value for generating pseudorandom numbers for multicast scheduling.

The seed values, cycle states, and thresholds of corresponding communication devices 100 are propagated through a network using heartbeat messages. This active heartbeat process also works to maintain up-to-date routing and link state tables, and can be used, in some implementations, to synchronize communication device clocks. In alternative embodiments, communication devices include the heartbeat information in the headers of other messages to propagate information with less delay. Heartbeat messages can be transmitted through the system as any other data message 207.

Figure 5:
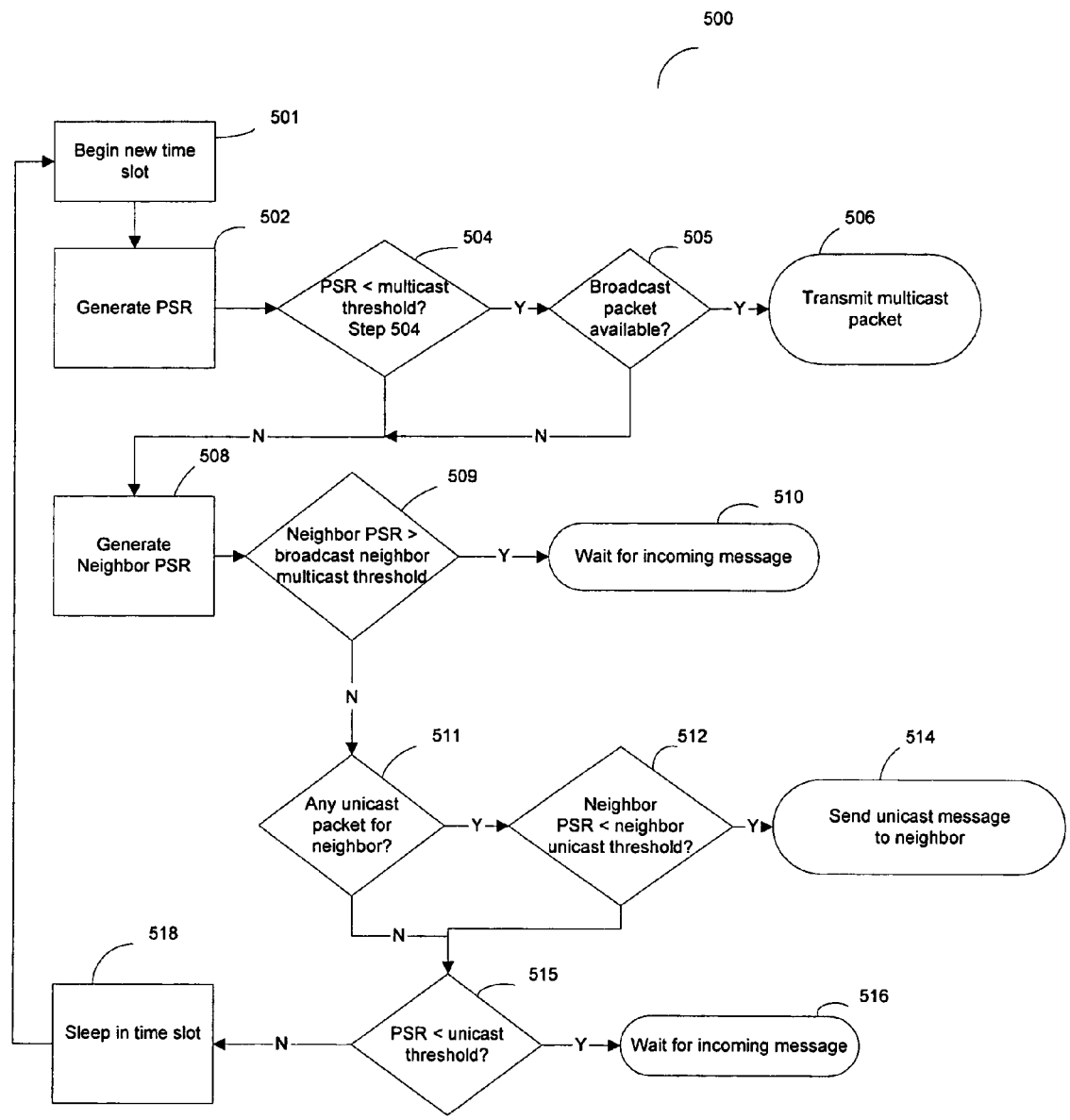
FIG. 5 is a flow chart of a method for scheduling communications between communication devices, such as those depicted in FIG. 1, configured for reduced energy communication according to an illustrative embodiment of the invention.

FIG. 5 is a flow chart of a method for communication scheduling 500 using pseudorandom number generation according to an illustrative embodiment of the invention. In this scheduling method 500, a communication device 100 prioritizes communication in the following order: multicast transmission, multicast receipt, unicast transmission, and unicast reception. Thus, for example, if the communication device 100 is available both for multicast transmission and unicast reception, the communication device 100 will choose to transmit a multicast transmission as multicast transmissions have a higher priority. A communication device 100 may employ other prioritizations, without exceeding the scope of the invention.

A period of time includes multiple time slots $201_0$, $201_1 \ldots 201_t \ldots 201_n$, where t is the cycle state, at the beginning of time slot $201_t$, a communication device 100 determines the next pseudorandom number ("PSR") for itself using its corresponding stored seed value and cycle state t (step 502). If the pseudorandom number generator provides a periodic output, the PSR may be obtained with by inputting t modulo the period of the output.

Based on the prioritization scheme listed above, the communication device 100 first determines whether the time slot $201_t$ should be used for transmitting a multicast transmission. To do so, it compares its corresponding multicast threshold with the PSR for the time slot $201_t$ (step 504). If the PSR falls below the multicast threshold, the communication device 100 transmits (step 506) a multicast packet (e.g., a heartbeat message), if one is queued for transmission (step 505).

If the PSR exceeds the multicast threshold (step 504), or if the communication device 100 does not have a multicast packet to send (step 505), the communication device 100 determines whether it should await a multicast transmission from one or more of its neighbors. To this end, the communication device 100 determines pseudorandom numbers for its known neighbors (step 508) for time slot $201_t$. This determination is based on the seed values, cycle states, and multicast thresholds received in heartbeat messages transmitted by the corresponding neighbors. If the PSR for a neighbor falls below that neighbor's corresponding multicast threshold (step 509), the communication device 100 waits for an incoming communication (step 510)

In a scenario in which the communication device 100 determines that it is not transmitting a multicast message and that its neighbors are not scheduled to multicast any data packets (step 509), the communication device 100 determines at step 511 whether it has any unicast data packets to send to its neighbors. If the communication device has a packet to send to a neighbor, the communication device at step 512 compares the PSR generated in step 508 for the recipient neighbor to that neighbor's unicast threshold. If the neighbor's PSR falls below the neighbor's unicast threshold, the communication device assumes the neighbor is available for receiving unicast communications. The communication device 100 at step 514 then transmits the unicast data packet to the neighbor using the transmission method described above in relation to FIG. 3. If the communication device 100 has unicast packets queued for multiple neighbors (step 512), the communication device 100 may transmit packets to more than one neighbor, assuming each corresponding neighbor is predicted to be awake based on its corresponding seed value, cycle state, and unicast threshold.

In the case where the communication device 100 determines that it has no messages to send, and no potential multicast messages to receive, it then determines at step 515 whether it should be available for receiving unicast messages. If the PSR of the communication device 100 falls below the unicast threshold of the communication device 100, the communication device 100 awaits incoming unicast messages (step 516). If the PSR exceeds the unicast threshold, the communication device 100 sleeps until the next time slot, $201_{t+1}$ (step 518).

According to another feature of the invention, to take into account a time varying network environment, the communication device 100 dynamically alters its unicast and multicast thresholds. For example, in a network environment that is rapidly changing, the communication device 100 benefits from frequent updates related to changes in the network topology. Multiple communication devices 100 on the network propagate topological information primarily using broadcast or multicast messages. Thus, in times of high network topology flux, each communication device 100 sets its multicast threshold to 1.0 so that it transmits and receives multicast messages whenever possible. Likewise, in stable network environments with little data traffic, each communication device 100 wastes energy by staying awake in more time slots than needed. Thus, in such environments, it decreases one or more of its thresholds. Preferably, each communication device 100 sets a threshold that balances the competing goals of energy conservation and efficient data throughput.

In one implementation, the communication device 100 maintains its unicast and multicast thresholds between a lower bound, for example, 0.1, and 1.0. According to one illustrative embodiment, a communication device 100 raises its thresholds faster than it decreases the threshold. For example, if the communication device 100 determines that a threshold should be raised, it may raise the threshold directly to a maximum value. Alternatively, if the communication device 100 determines that a threshold should be lowered, it may lower the threshold by a relatively small value, e.g., 0.1. In another embodiment, it may lower the threshold by multiplying the threshold by a real number between 0 and 1. In either case, the threshold is not lowered below the lower bound set for the particular threshold. Upon a communication device 100 determining to change one or more of its thresholds, it continues to operate using the former threshold until it transmits updated scheduling information to its neighbors.

To evaluate whether to alter the unicast or multicast threshold, the communication device 100 analyzes network traffic data and network flux data (e.g., the appearance or disappearance of other communication devices 100 to and from the network). It derives traffic data from one or more of an average of actual traffic history over a window of time slots, traffic output predictions from applications operating on the communication device 100, percentage of allocated time slots actually used, and minimum and maximum traffic history maintained by the communication device 100.

It derives network topology flux data from heartbeat and link state messages transmitted by other communication devices. Topology flux data may also be derived from data packet headers. A number of network topology change detections may prompt a communication device 100 to increase one or more of its thresholds to a maximum value, including, without limitation, communication device startup, detection of a new neighbor, an indication in a neighbor's heartbeat message indicating a new second hop neighbor, or a determination that a link state has changed within a predetermined number of hops of the communication device. After a predetermined number of time slots have passed without change in the network topology, the communication device 100 lowers the previously increased threshold.

In an alternative implementation, the communication device 100 provides alternative operating modes depending on the current network environment. For example, in one alternative operating mode particularly suited for high traffic network environments, each of a plurality of communication devices 100 transmit scheduling data corresponding to their neighbors in addition to their own scheduling data in heartbeat or other messages. According to one feature, each communication device 100 can determine from the scheduling data the pseudorandom numbers output and used by other communication devices 100 within a two-hop radius. In this operating mode, a communication device 100 stays silent in any time slot in which it predicts (based on the transmitted scheduling data) another communication device 100 within a two-hop radius will be transmitting a broadcast packet.

Additionally, for unicast transmissions in the alternative operating mode, each communication device 100 remains on for listening purposes in all time slots. Instead of using the PSR generated for a time slot to determine whether a communication device 100 should listen for messages, the communication device 100 utilizes the PSR to determine whether it should transmit a message. As communication devices 100 can determine the PSRs that neighboring communication devices generate for a given time slot, a particular communication device 100 transmits a message if its PSR is greater than the PSRs generated by its neighbors. The network gains additional benefits from entering this alternative operating mode if most or all communication devices 100 within a two-hop radius of a high traffic node support the alternative operating mode.

In another alternative implementation, the communication device 100 may have a single transceiver, which operates in at least two operational modes; for example, high-power and low-power operating modes. In such embodiments, the communication device 100 operates in a low-power operating mode for handling communication initiation and initiation acknowledgement messages, and uses the high-power mode for other messages.

In another alternative embodiment, the communication device 100 utilizes a single low-power transceiver for all communications. Such devices may be used, for example, for low-cost sensors. To implement the transmission and scheduling scheme in a single transceiver, single mode communication device, the communication device 100 can do away with a separate communication initiation message 205, unless an initiation acknowledgement message 211 is requested. Instead, the header of the data message 207 serves as the communication initiation message 205. A receiving communication device awakes in a given time slot t listens, for a portion of the data slot for a data message 207, decodes the header of the data message 207, and powers down its radio if the header indicates the rest of the data message 207 is not intended for that communication device.

When an initiation acknowledgement message 211 is requested, the transmitting communication device 100a transmits a communication initiation message 205 as a separate packet. The transmitting communication device 100a expects an initiation acknowledgement message 211 in response to the communication initiation message 205 and powers down its radio if it does not receive an initiation acknowledgement message 211. A receiving communication device 100b therefore goes through the process of: waking up at the beginning of the mini-slot 201, listening for data bits, decoding the data bits, determining if the header of the data message 207 indicates that this is just a communication initiation message 205 and there is an initiation acknowledgement message 211 expected. If an acknowledgement is expected, the receiving communication device 100b sends an initiation acknowledgement message 211 back to the transmitting communication device 100a.

The invention may be embodied in other specific forms without departing form the spirit or essential characteristics thereof. The forgoing embodiments are therefore to be considered in all respects illustrative, rather than limiting of the invention.

What is claimed is:

1. A communication device comprising:
    a first transceiver for transmitting a communication initiation message using low power transmissions to initiate communication with a second communication device in an ad hoc network;
    a second transceiver for transmitting data packets to the second communication device subsequent to initiating communications using the low power transmissions;
    a communications control processor in communication with the first transceiver and the second transceiver; configured for:
        receiving scheduling data from the second communication device sufficient to predict a time at which the second communication device will be accepting data communications;
        predicting the time at which the second communication device will be accepting data communications based at least in part on a dynamic threshold;
        causing the first transceiver to power up and transmit the communication initiation message to the second communication device at the predicted time;
        causing the second transceiver to power up and transmit at least one of the data packets to the second communication device subsequent to transmitting the communication initiation message;
        receiving, by the communication device, updated scheduling information including an updated dynamic threshold, indicating a changed availability of the second communication device.

2. The communication device of claim 1, wherein the communications control processor is configured to await receipt of an initiation acknowledgement message from the second communication device prior to causing the second transceiver to transmit at least one data packet to the second communication device.

3. The communication device of claim 1, wherein the communications control processor predicts the time at which the second communication device will be accepting the data communications based on a pseudorandom number generator shared between the communication device and the second communication device.

4. The communication device of claim 3, wherein the scheduling data includes a seed datum and a cycle state for the pseudorandom number generator.

5. The communication device of claim 1, wherein the dynamic threshold comprises a dynamic unicast threshold indicating an availability of the second communication device to receive unicast communications.

6. The communication device of claim 1, wherein the dynamic threshold comprises a dynamic multicast threshold indicating an availability of the second communication device to receive multicast communications.

7. The communication device of claim 1, wherein the dynamic threshold is based, at least in part, on a network traffic level.

8. The communication device of claim 1, wherein the dynamic threshold is based at least in part on a level of change in the network topology.

9. The communication device of claim 1, wherein the communication control processor is configured to:
await a data acknowledgement message from the second communication device following the transmitting of the data packet by the second transceiver; and
in response to failing to receive the data acknowledgment message after a predetermined amount of time, determining a time to cause the second transceiver to retransmit the data packet.

10. The communication device of claim 1, wherein the communication control processor is configured to:
request acknowledgement of receipt of the communication initiation message from the second communication device; and
in response to failing to receive an initiation acknowledgement message in a predetermined amount of time, waiting until a later time to transmit the data packet.

11. A communication device comprising:
a first low powered transceiver for receiving data communication initiation messages from a second communication device in an ad hoc network;
a second transceiver for receiving data packets from the second communication device in the ad hoc network subsequent to the first transceiver receiving the data communication initiation message;
a communications control processor in communication with the first lower-powered transceiver and the second transceiver for:
causing the second transceiver to transmit scheduling data including a dynamic threshold to the second communication device, wherein the scheduling data is sufficient to inform the second communication device of times at which the communication device will be available for receiving communication initiation messages;
determining a time to power-up the first lower-powered transceiver based on the scheduling data, including the dynamic threshold;
powering-up the first low-powered transceiver at the determined time to allow receipt of incoming communication initiation messages; and
in response to the first low-powered transceiver receiving a communication initiation message, powering up the second transceiver to receive an incoming data packet; and
causing the second transceiver to transmit updated scheduling information including an updated dynamic threshold to vary the availability of the communication device.

12. The communication device of claim 11, wherein the communications control processor determines whether it should power-up the first lower-powered transceiver based on the output of a pseudorandom number generator shared between the communication device and the second communication device.

13. The communication device of claim 11, wherein the dynamic threshold is based at least in part on a network traffic level.

14. The communication device of claim 11, wherein the dynamic threshold is based at least in part on a level of change in a topology of the network.

15. The communication device of claim 11, wherein the scheduling data includes a seed datum and a cycle state for the pseudorandom number generator.

16. The communication device of claim 11, wherein the dynamic threshold comprises a dynamic multicast threshold indicating an availability of the communication device to receive multicast communications.

17. The communication device of claim 11, wherein the dynamic threshold comprises a dynamic unicast threshold indicating an availability of the communication device to receive unicast communications.

18. The communication device of claim 11, wherein the communication control processor determines whether it successfully received a data packet and informs the second communication device of the determination.

19. A method of transmitting data from a first communication device to a second communication device in an ad hoc network comprising:
predicting by the first communication device, a time at which the second communication device of the ad hoc network will accept data packets based on scheduling data received from the second communication device, wherein the scheduling data includes a dynamic threshold indicating an availability of the second communication device to receive communications;
powering up a first lower-powered transceiver at the predicted time;
transmitting by the first communication device of the ad hoc network a communication initiation message to the second communication device at the predicted time using the powered-up first low-powered transceiver;
transmitting, by the first communication device, after the transmission of the communication initiation message, a data packet to the second communication device using a second transceiver; and
receiving, by the first communication device, updated scheduling information including an updated dynamic threshold, indicating a changed availability of the second communication device.

20. A method of receiving data at a first communication device from a second communication device in an ad hoc network comprising:
transmitting, by the first communication device, scheduling data to the second communication device wherein the scheduling data, includes a dynamic threshold indicating an availability of the first communication device to receive
communications and is sufficient to inform the second communication device of at least one time at which the first communication device will be available to receive communication initiation messages;
determining, by the first communication device, a first of the at least one times based on the scheduling data, including the dynamic threshold;
powering-up a first lower-powered transceiver by the first communication device at the determined first time;
in response to the first lower-powered transceiver receiving a communication initiation message, powering up a second transceiver by the first communication device to receive an incoming data packet; and
transmitting by the first communication device updated scheduling information including an updated dynamic threshold to vary the availability of the first communication device.

21. The method of receiving data of claim 20, comprising:
powering down the first lower-powered transceiver based on the scheduling data; and powering down the second transceiver after receiving the data packet.

22. The method of receiving data of claim 20, comprising the first communication device transmitting an acknowledgement message to the second communication device indicating successful receipt of the data packet.

23. The method of receiving data of claim 20, wherein the determination of the the first time includes the use of a pseudorandom number generator.

24. The method of receiving data of claim 20, wherein the dynamic threshold is changed based on one of a traffic level in the network and a level of change of a network topology.

25. A communication device comprising:
a first transceiver for transmitting data packets to a second communication device;
a communications control processor in communication with the transceiver for:
receiving scheduling data from a second communication device, wherein the scheduling data includes a dynamic threshold indicating an availability of the second communication device to receive data and the scheduling data is sufficient for the first communication device to predict, using a shared pseudorandom number generator and the scheduling data, a time at which the second communication device will be accepting data communications;
causing the first transceiver to transmit a data packet to the second communication device at about the predicted time; and
awaits receipt of a data acknowledgement message by the first transceiver following the transmission of a data packet; and
in response to the first transceiver failing to receive a data acknowledgment message after a predetermined amount of time, determines a time to retransmit the data packet;
causing the first transceiver to transmit updated scheduling information including an updated dynamic threshold to vary the availability of the communication device.

26. The communication device of claim 25, wherein the communications control processor awaits receipt by the first transceiver of an initiation acknowledgement message prior to causing the transmitting of the data packet.

27. The communication device of claim 25, wherein the scheduling data includes a seed datum and a cycle state for the pseudorandom number generator.

28. The communication device of claim 25, wherein the scheduling data includes a unicast threshold indicating an availability of the second communication device to receive unicast communications.

29. The communication device of claim 25, wherein the scheduling data includes a multicast threshold indicating an availability of the second communication device to receive multicast communications.

30. The communication device of claim 25, wherein the dynamic threshold is based at least in part on a network traffic level.

31. The communication device of claim 25, wherein the dynamic threshold is based at least in part on a level of change in a network topology.

32. The communication device of claim 25, wherein the communication control processor:
causes the first transceiver to request acknowledgement of receipt of the communication initiation message from the second communication device; and
in response to the first transceiver failing to receive an initiation acknowledgement message in a predetermined amount of time, waits until a later time to transmit the data packet.

* * * * *